(12) United States Patent
Crutchfield et al.

(10) Patent No.: US 8,281,649 B1
(45) Date of Patent: Oct. 9, 2012

(54) ADVANCED HOT SECTION MATERIALS AND COATINGS TEST RIG

(75) Inventors: Jeffrey M Crutchfield, Jupiter, FL (US); Daniel O Davies, Palm City, FL (US); Ross H Peterson, Palm Beach Gardens, FL (US); Mark M Harris, Palm Beach Gardens, FL (US); Natalie L Marshall, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 384 days.

(21) Appl. No.: 12/814,130

(22) Filed: Jun. 11, 2010

(51) Int. Cl.
*G01M 15/14* (2006.01)
(52) U.S. Cl. .................................................. 73/112.01
(58) Field of Classification Search ............... 73/112.01, 73/112.03
See application file for complete search history.

(56) References Cited

U.S. PATENT DOCUMENTS

| | | | |
|---|---|---|---|
| 3,029,635 A | 4/1962 | Fetz | |
| 3,263,485 A | 8/1966 | Mahmoodi | |
| 3,323,586 A | 6/1967 | Burne et al. | |
| 3,667,747 A | 6/1972 | Grossman | |
| 4,189,939 A | 2/1980 | West et al. | |
| 5,080,496 A | 1/1992 | Keim et al. | |
| 5,230,241 A * | 7/1993 | Boet | 73/116.03 |
| 5,260,218 A | 11/1993 | Garde | |
| 5,707,147 A | 1/1998 | Kurkowski et al. | |
| 5,720,554 A | 2/1998 | Smith et al. | |
| 5,865,598 A | 2/1999 | Twerdochlib | |
| 5,935,459 A * | 8/1999 | Butefisch | 219/121.52 |
| 6,497,137 B2 * | 12/2002 | Helgeson | 73/23.31 |
| 6,582,184 B2 | 6/2003 | Little, Jr. | |
| 6,739,184 B2 | 5/2004 | Brazeau et al. | |
| 6,923,051 B2 | 8/2005 | Fleming | |
| 7,174,797 B2 | 2/2007 | Brostmeyer et al. | |
| 7,506,555 B2 | 3/2009 | Brostmeyer et al. | |
| 7,574,904 B1 | 8/2009 | Davies et al. | |
| 2004/0216535 A1 * | 11/2004 | Brostmeyer et al. | 73/865.6 |
| 2007/0089548 A1 * | 4/2007 | Brostmeyer et al. | 73/866 |
| 2008/0034851 A1 * | 2/2008 | Anderson | 73/116 |
| 2012/0152007 A1 * | 6/2012 | Holmes et al. | 73/112.01 |

* cited by examiner

*Primary Examiner* — Eric S McCall
(74) *Attorney, Agent, or Firm* — John Ryznic

(57) ABSTRACT

A test rig that reproduces high temperature and high pressure conditions found in a gas turbine engine for testing materials under these conditions. The test rig includes a combustor surrounded by an upper plenum chamber and an exhaust plenum that receives a hot gas stream from the combustor. A transparent channeling vessel guides the hot gas stream from the combustor over a test specimen on which a material to be tested is mounted. The hot gas stream exits the clear channeling vessel and into the exhaust plenum where the stream is cooled by diluting the stream with cooling air. A viewing portal is located in the exhaust plenum so that the material can be observed through the clear vessel.

18 Claims, 6 Drawing Sheets

ADVANCED HOT SECTION MATERIALS AND COATINGS TEST RIG

STATEMENT REGARDING FEDERALLY SPONSORED RESEARCH OR DEVELOPMENT

None.

CROSS REFERENCE TO RELATED APPLICATIONS

None.

BACKGROUND OF THE INVENTION

1. Field of the Invention

The present invention relates to an apparatus and a method of testing materials in a high temperature and pressure environment, and thereby simulating actual conditions present in a gas turbine engine.

2. Description of the Related Art Including Information Disclosed Under 37 CFR 1.97 and 1.98

Existing known techniques for testing materials to be used in a gas turbine engine are very expensive or do not properly expose the testing material to actual engine operating conditions. One known method is to use an actual gas turbine engine and place the material to be tested on a part in the engine while the engine is operating. This method requires an operating gas turbine engine that is very expensive to operate. An engine test can test a material or a coating for: spallation due to high thermal gradients; erosion due to high velocity flow; corrosion degradation due to trace elements in fuel at operating temperatures and pressures; and, includes the ability to apply axial loading in addition to thermal loading to the test specimen. However, the engine test method is very expensive to operate (about $6,000 per hour to operate), the test conditions are limited to current technologies (pressures, temperatures, stresses) used in the specific testing gas turbine engine, availability of engine hardware, engine test facility, and large staffing requirements, and limited hot time accumulated (generally less than 300 hours).

A less costly method of testing that does not require an operating gas turbine engine is a burner rig. Existing rigs for testing turbine coating/material combinations use a hot flame impingement onto a material/coating specimen to ascertain material/coating durability under hot conditions. While these burner tests are more easily accomplished than full engine tests, are typically of low cost, and are sometimes satisfactory as a screening method, they fail to duplicate many of the parameters leading to material/coating failures observed in actual component designs. Of the conditions described above with respect to the engine test method, a burner rig can provide for a low cost method of testing materials, the burner rig does not allow for the testing for: coating spallation due to high thermal gradients; for erosion to high velocity flow; or for the ability to apply axial loading in addition to thermal loading to the test material.

Realistic engine gas path conditions include high thermal gradients in the test specimen, thermal and mechanical fatigue loading, and erosion due to high velocity gas flow. In real engines, the coating/material components are subjected to cyclical mechanical loading that can affect metal and coating durability and coating adhesion. In addition, the hot gas often contains trace contaminants that can cause corrosion of the metal/coating systems. High velocity gas flows can erode the gas path materials which also reduce their durability. Burner rigs are limited in that no mechanical loading can be applied to the specimen, and that the flow is not at high velocity so that TMF and erosion mechanisms are not duplicated in the test system.

Other complex systems are being developed for advanced testing of gas path materials. The Westinghouse Plasma Corporation's facility in Waltz Mills, Pa. uses a plasma torch to heat material specimens to high thermal loading and also includes mechanical loading capability to simulate TMF conditions. Currently the system is limited to heat flux levels less than 1.2 MBtu/hr/ft$^2$. The system is also not able to support investigation of erosion failure mechanisms since there is no high velocity flow. Moreover, the ability to accurately measure temperature on the front and backsides of the specimen (to determine thermal gradient) is questionable.

A third system is under development by NASA as part of the Ultra Efficient Engine Technology (UEET) program. This system uses a laser generated heat flux to heat the specimen to high thermal gradients. The current system can achieve approximately 1 MBtu/hr/ft$^2$. It is unknown if mechanical loading can be applied to the specimen, however, the system is limited in its ability to duplicate erosion failure mechanisms. Further, the system is not pressurized, but does have cooling through the middle of the specimen.

The degradation process that require characterization include coating erosion, spallation, thermal mechanical fatigue, low cycle fatigue, hold-time effects, as well as the interaction of these failure mechanisms. With extremely high cost of developing a new engine concept, especially when operating conditions will exceed all current experience, low cost test rigs are the prudent way to screen new concepts and materials prior to committing to actual engine hardware and full engine testing.

An earlier version of the applicant's advanced hot section materials and coating test rig is disclosed in U.S. Pat. No. 7,174,797 issued on Feb. 13, 2007 and entitled HIGH TEMPERATURE AND PRESSURE TESTING FACILITY. This test rig has the capability of producing a tensile stress in the test material in order to simulate the rotating conditions of a turbine rotor blade. However, this test rig uses water as well as air to provide cooling for the test rig. The use of water leads to leaks in which the water could vaporize into high temperature steam and cause serious damage to personnel operating the test rig. The prior art test rig also lacks the ability of optically view the material during the testing process. The combustor in this prior art test rig includes injectors that are in radial alignment so that no swirl is produced in the combustor. The radial injectors cause an uneven hot gas flow that is then passed over the test material such that the variation of temperature that a section of the test material is exposed to can be around 3,000 degrees F.

Another earlier version of the applicant's advanced hot section materials and coating test rig is disclosed in U.S. Pat. No. 7,506,555 issued on Mar. 24, 2009 and entitled PROCESS AND APPARATUS FOR TESTING A MATERIAL UNDER A HIGH TEMPERATURE AND PRESSURE ENVIRONMENT, and U.S. Pat. No. 7,574,904 issued on Aug. 18, 2009 and entitled ADVANCED HOT SECTION MATERIALS AND COPATING TEST RIG. Both of these earlier test rigs also used water as well as air for cooling, and did not have the capability of optically viewing the test material during the testing process. Also, the combustors were radial injectors that did not produce a swirl in the combustion gas.

There is a need in the prior art for a test rig that can provide a low cost way to test materials for use in gas turbine engines, as well as a test rig that can reproduce all the conditions such as high temperature, high pressure, erosion, corrosion, and thermal and mechanical loading, that occur in an operating gas turbine engine in which the material being tested can be viewed optically during the testing process.

BRIEF SUMMARY OF THE INVENTION

The inventors of the present invention have developed an innovative approach for testing advanced materials and coatings for the gas turbine industry. The effort is in response to the industry's need to understand how hot gas path materials and coatings will perform under advanced turbine operating conditions. Emerging missions are being designed to operate at high overall pressure ratio, high turbine temperatures, and for extended periods of time. A low-cost test facility that can simulate Versatile Affordable Advanced Turbine Engine (VAATE) conditions is required to economically test the combustor and turbine materials and thermal/environmental barrier coatings that are needed to satisfy extreme operating parameters. The inventors have developed a unique low-cost/high heat flux materials test system to simulate the VAATE engine missions. The design offers a high heat flux (up to 628,000 Btu/hr/ft$^2$) without film cooling, thermal and mechanical fatigue loading at engine representative conditions, and lower cost of testing of high thermal gradient gas path conditions.

The test rig of the present invention will allow coated specimens to be exposed to hot gas at accurate engine temperatures and pressures, with mechanical (axial tensile) loads applied via a pressure diaphragm. The test conditions are pressures of up to 200 psi and temperatures of up to 3,000 degrees F., which exceed current testing capabilities, represent future advanced engine hot gas path conditions on one side of the sample and cooling side heat transfer on the other side of the sample.

The test rig of the present invention can be used to investigate the durability of a combination of substrate materials, thermal barrier coatings (TBC), and bond coats in an environment and under loading conditions that closely represent a turbine engine airfoil in its gas path. Extreme temperature gradients and transients thermally induce the most severe cyclic stresses that turbine airfoils encounter. These thermally induced stresses, which combine with mechanically induced centrifugal and gas bending loads produce thermal mechanical fatigue (TMF) of the airfoil. Strain range, temperature, mean stress, frequency and dwell time are important parameters affecting the TMF life of turbine airfoils and their coatings. The coating and bond coat play key roles in the TMF failure process; consequently the alloy, the bond coat and the coating must be considered a system for TMF evaluations. The test rig will provide a cost effective means to test combinations of coated airfoil systems in a representative environment and realistically characterize their damage states. These data combined with thermal and structural analyses, and life-modeling developments, will provide the basis for a reduced risk airfoil design process for gas turbine engines.

The value of the test rig of the present invention in developing advanced materials and coatings for turbine and combustor applications has been recognized by the military and industrial engine manufacturers and coating suppliers. The test rig of the present invention is comprehensive and offers turbine engine designers an affordable, quick method to evaluate coatings and high temperature materials without having to rely on costly, time consuming full engine tests. It also reduces the risk of failures that could occur during full engine testing of a new coating or high temperature alloy. What makes the test rig of the present invention so valuable is its ability to simulate aggressive engine conditions at low cost, enabling long-term engine relevant conditions without the expense of a full engine test.

The test rig of the present invention utilizes a small multiport radial jet combustor to produce a hot gas stream. The hot gas is accelerated into a test section that includes a cooled inner pipe containing the test material coupons and coatings. Temperature and pressure are carefully maintained within the annular passage by control of the combustor air supply pressure, the airflow rate, and the fuel flow rate. Up to 32 strategically placed sensors measure the pressure and temperature at critical locations within the test section. Computer controlled software allows for monitoring of conditions in real time. An innovative cooling design enables the specimen surface temperature to be accurately controlled throughout the course of the test.

High heat flux and thermal gradient is accomplished by subjecting the test coupon to two different thermal environments. One side of the specimen is exposed to high velocity combustion gas (up to 3,000 degrees F. and 200 psi), representing the hot gas side of the coated airfoil. The other side is exposed to a coolant (such as pressurized air) that represents airfoil coolant air.

To simulate turbine blade environments on both the hot gas flow path side as well as the cooling circuit side, a cylindrical sample was selected which is placed inside a larger cylindrical vessel. An annular hot gas flow path is formed by the outside diameter of the test article and the inside diameter of the outer vessel. The inner diameter of the sample serves as a cooling flow conduit. High velocity hot gas to 3,000 degrees F. and cooling temperatures to 500 degrees F. are used to create a representative engine environment. For any given fixed hot gas (source) and coolant temperature (sink), there exist a range of temperatures that depend solely on the overall thermal resistance in the radial direction.

A swirl combustor is used to produce a hot gas flow that is passed over the test specimen in order to produce a more uniform heat flux around the specimen. A number of injectors are arranged around the combustor for both the fuel and the air such that a swirling motion is produced that results in a longer flow path for the combustion products to produce the hot gas flow and to form a more even distribution of temperature.

For any given hot gas (source) and coolant temperature (sink), there is a range of temperatures that depend solely on the overall thermal resistance in the radial direction. In the absence of radiation, the overall thermal resistance can be delineated into convective (gas and coolant side) and conductive (substrate) mechanisms. While the conductive effects are passive, the convective effects can be controlled. Changing the levels of both hot gas and coolant convection allows for control of the test specimen temperature to a desired value. For a fixed annular geometry, varying flow rate and pressure can control the desired external hot gas convection.

An outer hot gas path is formed by a test vessel that is made of single crystal alumina (sapphire vessel) which is a clear but very brittle material that will form the hot gas path over the material substrate that is being tested while allowing for an optical viewer to see the test material during the testing. The sapphire vessel is simple is shape with no notches that would produce high stress levels, and with a cylindrical shape having a conical inlet end so that the thermal stress loads at the interface between the sapphire vessel and the test rig support is not excessive.

The test rig uses only air for the combustor to be burned with the fuel, for the cooling fluid for the test rig, and for the pneumatic cylinder that is used to produce the tensile loading on the test material. Since only air is used for all applications of a fluid within the test rig, only one source of compressed air is required, and any leakage of the compressed air will not result in the production of high temperature gas such as steam that could lead to serious damage to the operator. The use of a non-combustible fluid such as air will eliminate any potential damage to the test rig or the operator of the test rig from leakage of the fluid. If a combustible fluid such as oil was used, any oil leakage could ignite from contact with a hot surface of the test rig.

Another feature of the test rig of the present invention is that the test rig is oriented in a vertical axis with the material testing part located above the pneumatic cylinder and other parts of the test rig. Any leakage from anywhere on the rig will therefore not be located above the material testing part which is the hot part of the test rig.

DETAILED DESCRIPTION OF THE INVENTION

Figure 1:
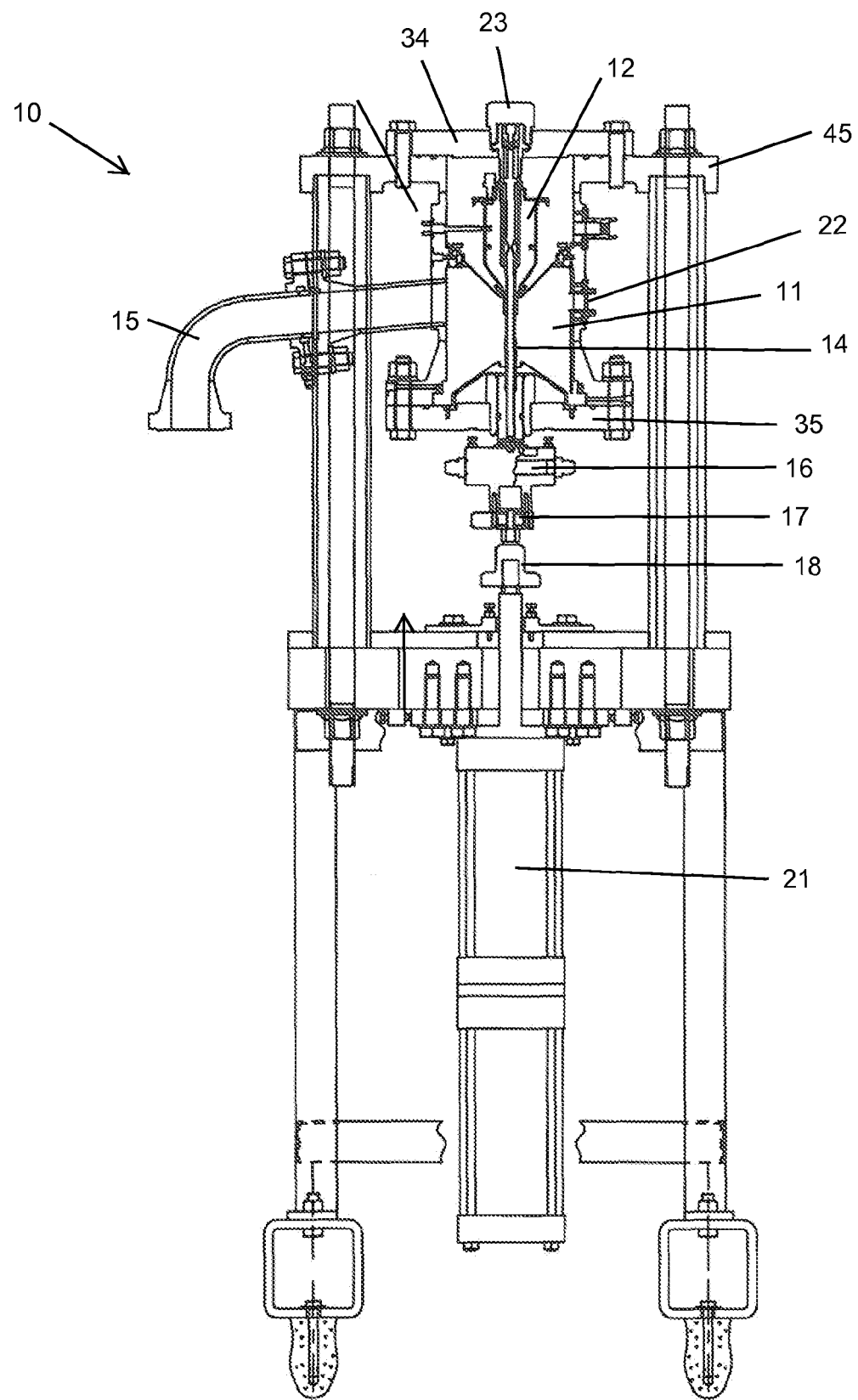
FIG. 1 shows a cross section view of the test rig of the present invention.

The present invention is a low-cost test facility that can simulate operating conditions in a gas turbine engine for economical testing of combustor and turbine materials and thermal/environmental barrier coatings that are needed to satisfy extreme operating parameters for extended periods of time. The general arrangement of the test facility 10 is shown in FIG. 1 which includes support posts (upper half) and a support frame (lower half) that are anchored to structural tubing (such as 6" by 6" rectangular hollow tubes) that are bolted to a concrete floor. Other sizes of support tubes can also be used if the strength is adequate.

The test rig or test facility 10 includes an exhaust mixing plenum 11, a combustor 12 mounted above the exhaust plenum 11, a test specimen 14 that is formed as a hollow cylindrical tube, an exhaust port 15, a lower attachment 16, a load cell 17, an adapter 18, a pneumatic actuator 21, and a threaded cap 23, among other features and structure. The hot section of the test rig includes the combustor 12 and the exhaust plenum 11 and is secured between a lower cap 35 and an upper cap 34 with the upper cap 34 secured to a main casing 45 of the hot section through bolts. One or more coating to be tested is secured onto the outer surface of the test specimen 14. The pneumatic actuator will apply a tensile load to the test specimen 14 during the testing process.

Figure 2:
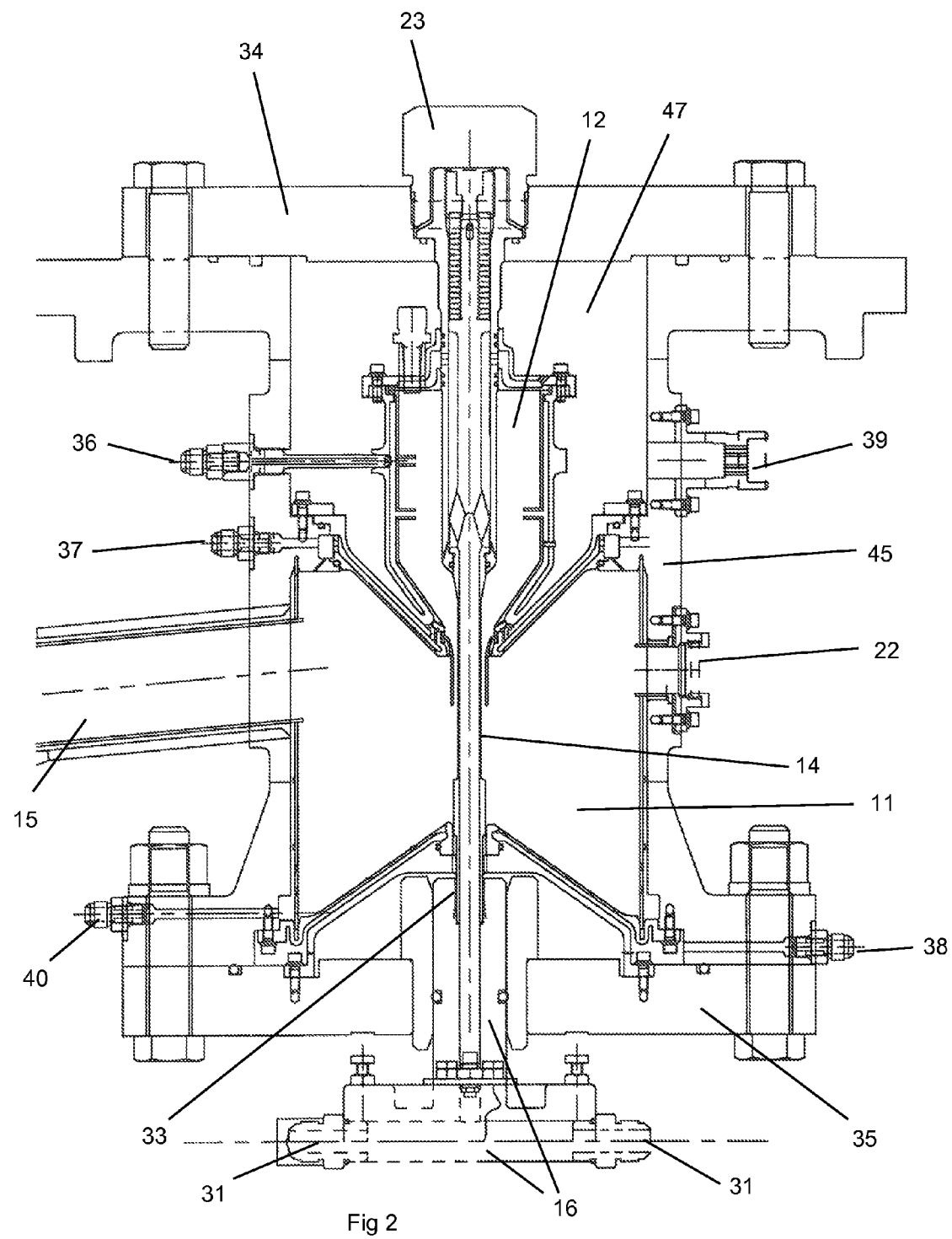
FIG. 2 shows a cross section view of the hot section of the test rig of FIG. 1.

FIG. 2 shows a more detailed view of the hot section of the test rig 10 with a main casing 45 secured to the upper cap 34 through a number of bolts. The main casing 45 is then secured to the support posts. A viewing portal 22 is formed in the main casing 45 and includes an optical port liner and a cap bolted to the main casing. The cap includes a sapphire piece that forms a glass-like enclosure for viewing the test specimen 14 through a clear sapphire containment vessel 53. The sapphire vessel 53 functions as a hot gas stream channeling vessel to guide the hot gas stream from the combustor over the test specimen 14 outer surface. The exhaust port 15 is connected to the exhaust plenum 11 so that the hot gas stream formed in the combustor can be discharged from the test rig. The test specimen 14 is threaded into an extension of the lower attachment 16 at a threaded interface 33 between the two pieces. The lower attachment 16 includes inlet air openings 31 that supply air to the combustor 12 through the test specimen 14. The lower attachment 16 includes multiple inlet air openings 31 so that it can be rotatably positioned on the test rig for securing one or more air supply hoses. The inlet air opening 31 on the left is closed with a cap. The hot section also includes a number of cooling air supply ports (37-40) positioned around the hot section to supply air to the test rig 10. The threaded cap 23 is threaded onto the upper cap 34 for ease in installation and removal of the test specimen 14 from the test rig 10. A number of fuel injector ports 36 are positioned around the side casing 45 of the hot section of the test rig to inject fuel into the combustor 12.

The combustor 12 of the test rig is surrounded by an upper plenum 47 that is enclosed so that the cooling air passing through the test specimen 14 will collect in the upper plenum 47 to swirl around the combustor for cooling, and then be directed through the cooling passages formed around the combustor walls and into the combustor chamber through film cooling holes or air injector ports spaced around the combustor 11. a number of ful injector ports 36 are spaced around the combustor 12 to inject fuel into the combustor chamber.

Figure 3:
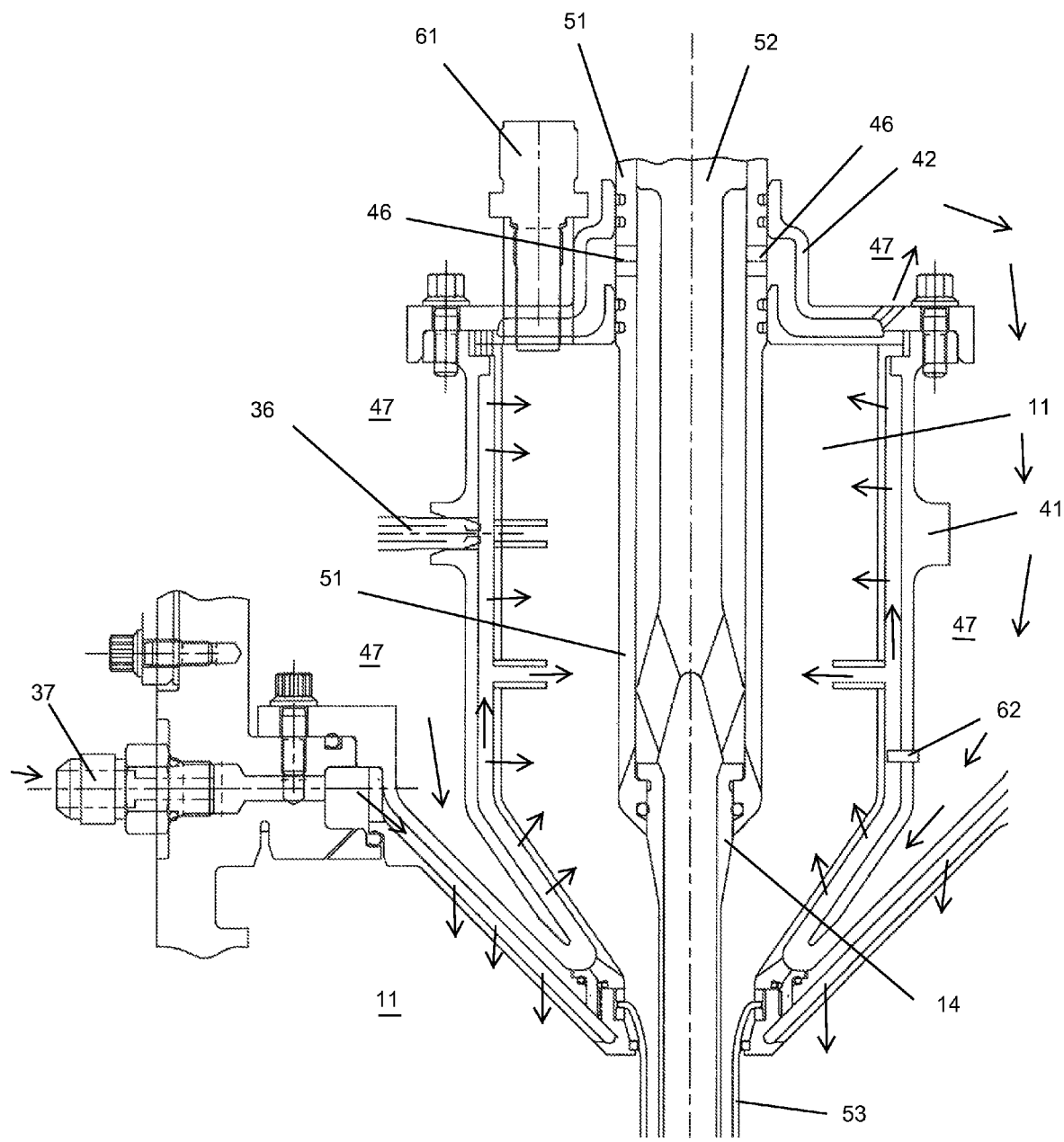
FIG. 3 shows a cross section view of the combustor of the test rig of FIG. 1.

FIG. 3 shows a detailed view of the combustor 12 and the cooling air flow path into the combustor 12 and then the hot gas stream out from the combustor 12. The hot section of the test rig includes a combustor wall surrounded by combustor liners 41 and 42 that forms a cooling air flow path around the combustor wall for cooling purposes. The upper combustor liner 42 is bolted to the middle and lower combustor liner 41 in which the lower section tapers to a smaller diameter open where the sapphire vessel 53 begins. The cooling air flows through the inner section of the test specimen 14 and then through a space formed between a plunger rod 52 and a specimen holder 51 and then through outlet ports 46 formed on the upper end of the specimen holder 51 and into the space between the upper combustor liner 42 and the combustor wall. The combustor 12 and the combustor liners 41 and 42 are contained within an upper plenum chamber 47 so that the air flows around the combustor prior to entering the combustor chamber. This provides cooling for the combustor and preheating of the air used in the combustor 11. pins 62 are spaced around the combustor liner and abut on the combustor walls to provide support for the combustor walls and to align the combustor liner with the combustor walls.

The air flow around the combustor 12 flows from the upper plenum chamber 47 and into the bottom of the combustor liner 41, and then flows upward in the space between the combustor liner 41 and the combustor wall. Film cooling holes are formed in the combustor walls to discharge film cooling air into the combustor chamber. A number of air injector ports 66 are spaced around the combustor wall to inject air used for the combustor 12, where the injector ports 66 are angled so that a swirl flow is generated within the combustor 11 to increase the flow path for combustion so that an even temperature of combustion is produced prior to passing the hot gas stream through the sapphire vessel 53.

Figure 4:
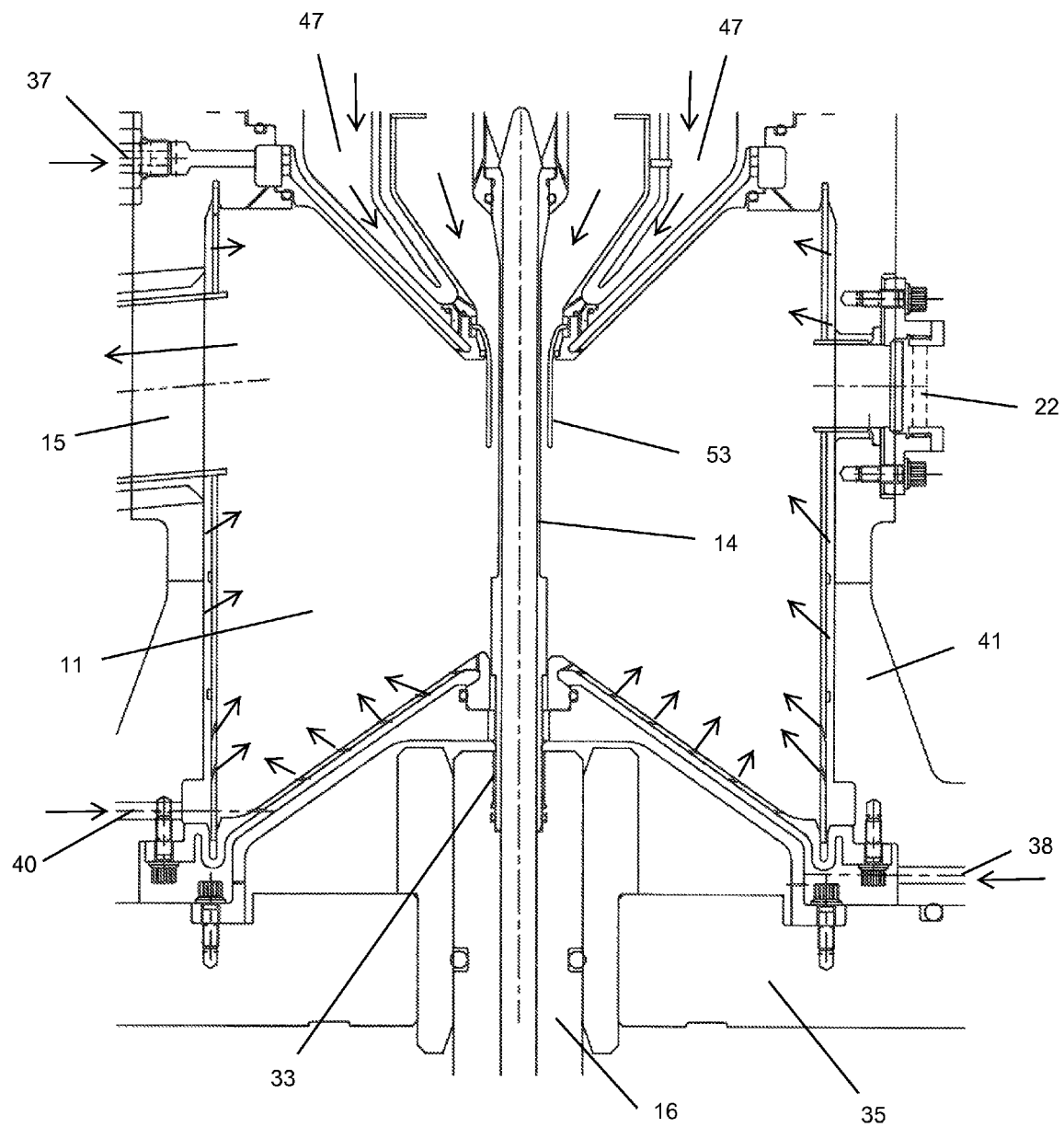
FIG. 4 shows a cross section view of the exhaust plenum of the test rig of FIG. 1.

FIG. 4 shows the exhaust plenum 11 that receives the hot gas stream from the combustor 12 to pass over the test specimen 14 on which one or more coatings to be tested are mounted. The sapphire vessel 53 opens into the exhaust plenum 11. The exhaust plenum 11 includes an upper plenum liner, an outer plenum liner and a lower plenum liner all located within the main casing to form a cooling air path that surrounds the exhaust plenum 11. The test specimen 14 is threaded onto an upper end of the lower attachment 16 extension. The optical port 22 is positioned to view the test specimen 14 through the clear sapphire vessel 53. The cooling air supply ports (37-40) deliver cooling air to various sections around the exhaust plenum to provide cooling and to supply dilution air to the hot gas stream flowing out from the sapphire vessel 53 in the space between the test specimen 14. The mixture of hot gas stream and dilution cooling air is then discharged from the exhaust plenum 11 through the exhaust tube 15. Cooling air port 37 delivers cooling air around the upper plenum that then flows through film cooling holes formed within the upper plenum and into the exhaust plenum chamber 11 to dilute the hot gas stream from the combustor 12. The cooling air port 38 flows into the space between the lower plenum and the casing to provide cooling for the lower section of the exhaust plenum, where this cooling air flows through film cooling holes and into the exhaust plenum 11 to dilute the hot gas stream. The cooling air port 40 supplies cooling air in the space on the outer sides of the exhaust plenum from the top edge to the bottom edge. Film cooling holes are also spaced around the sides of the exhaust plenum that enters the exhaust plenum 11 as dilution air. Arrows in FIG. 4 represent the cooling air flow and the hot gas stream flow through the hot section of the test rig 10.

Cooling air from ports 38 and 40 will flow around the lower plenum liner and then into the exhaust plenum 14 through a number of cooling air holes. Cooling air from port 37 flows around the upper plenum wall to cool this part of the exhaust plenum, and then around the combustor to also provide cooling for the combustor before passing into an upper plenum chamber 47 formed over and around the combustor 12.

Figure 5:
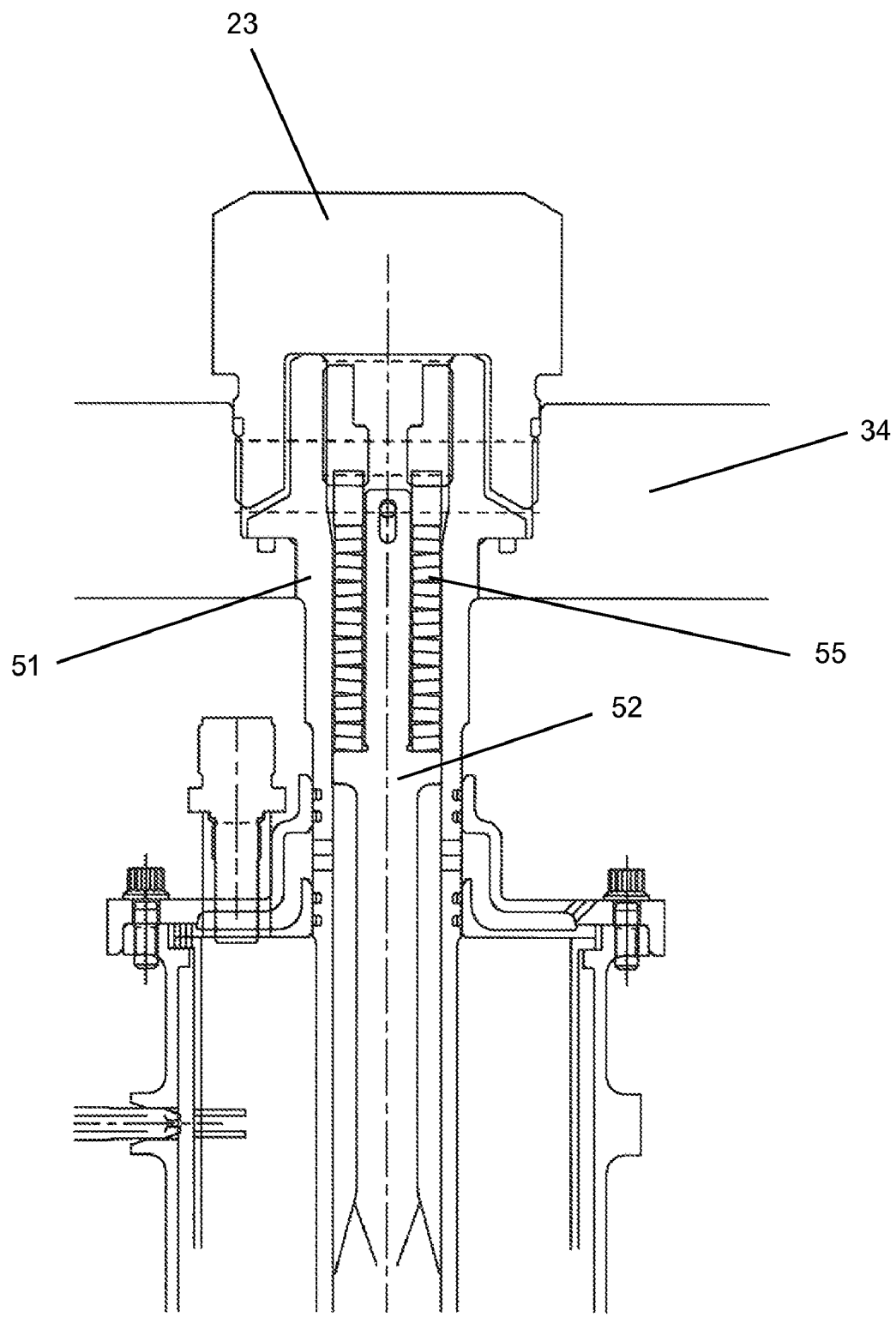
FIG. 5 shows a cross section view of the plunger rod and test specimen holder of the test rig of FIG. 1.

FIG. 5 shows the specimen holder 51 secured in place within an opening formed in the upper cap 34 when the threaded cap 23 is secured in place. The threaded cap 23 includes an inner abutment surface that contacts with an upper end on the specimen holder 51. The plunger rod 52 is secured within the specimen holder 51 and abuts an upper end of the test specimen 14 as seen in FIG. 3 on the bottom end. The plunger rod 52 includes cooling air ports that allow for the cooling air to flow from the test specimen 14 and into the space formed between the specimen holder 51 and the plunger rod 52. a spring 55 forces the plunger rod 52 down and against the upper end of the test specimen 14 when the threaded cap 23 is screwed into place. A lower end of the test specimen 14 is secured to the upper projection of the lower attachment 16 described above.

Figure 6:
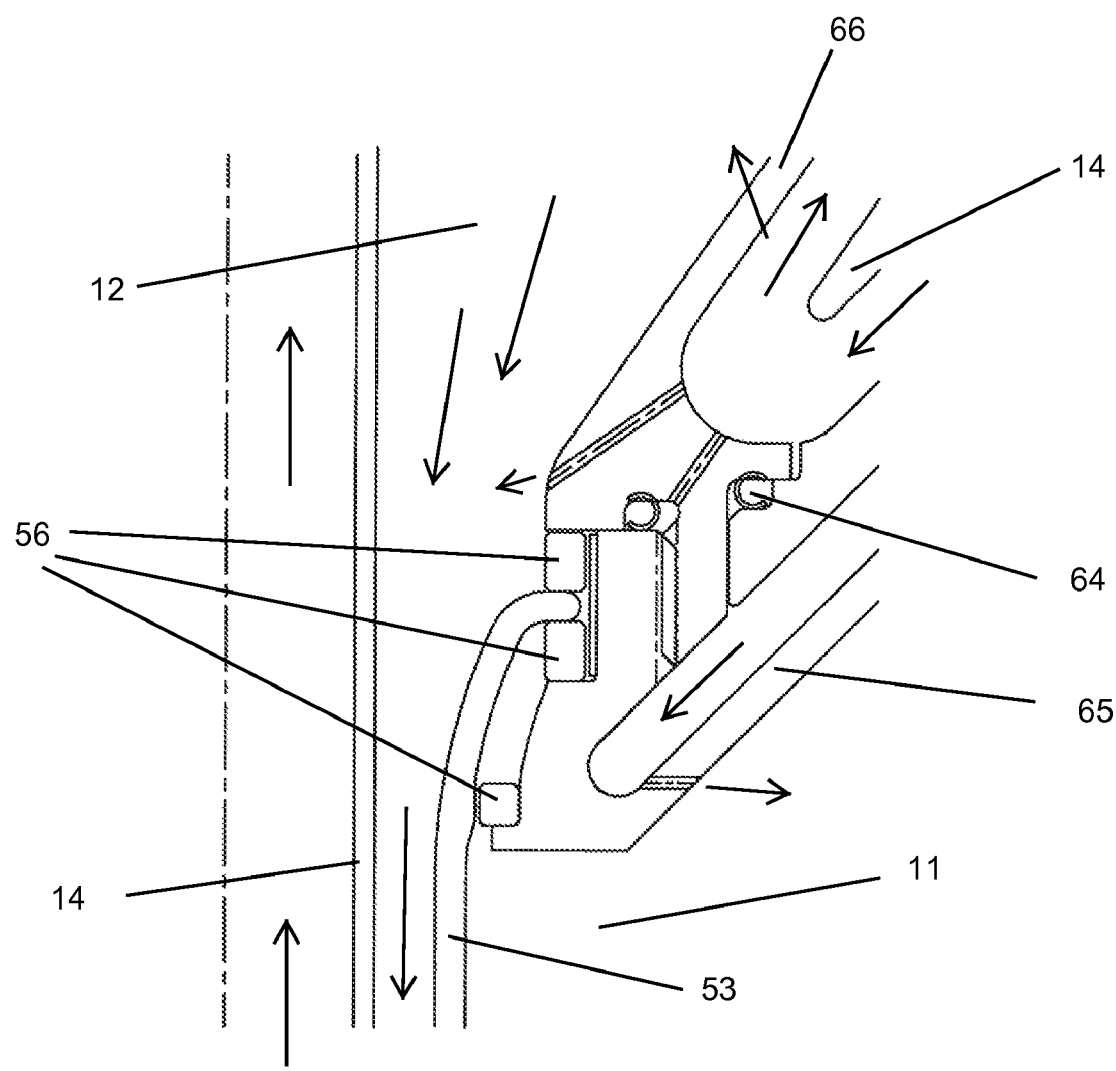
FIG. 6 shows a cross section view of the sapphire containment vessel interface with the combustor and plenum sections of the test rig of FIG. 1.

The sapphire containment vessel 53 forms a hot gas stream flow path from the combustor chamber to the exhaust plenum 11 that directs the hot gas flow over the test specimen 14 on which the coating or coating are placed to be tested. The sapphire containment vessel 53 is transparent so that the material that is being tested can be observed through the optical port 22 during the testing process. The sapphire containment vessel 53 is secured on one end while free floating on the opposite end in order to limit any stresses since the vessel is a very brittle material. FIG. 6 shows the upper end of the sapphire containment vessel 53 secured to the upper plenum liner with a lower end of the combustor and the combustor liner 14 forming a secure connection.

FIG. 6 shows a detailed view of the connection between the sapphire vessel 53 and the combustor wall 66 and the upper plenum wall 65. The upper end of the sapphire vessel 53 is secured between two annular ceramic washers 56 that are held in an annular groove formed between the combustor wall and the upper plenum wall. A third ceramic washer 56 is used to support and position the sapphire vessel 53 with respect to the test specimen 14 to maintain a constant flow path between the sapphire vessel 53 and the test specimen 14. C-seal rings 64 are used to form a seal between the combustor wall 66 and the upper plenum wall 65.

The cooling air flow for the test rig 10 operates as described below. Cooling air flows through the air inlet port 31 on the lower attachment piece 16 and into the bottom end of the test specimen 14. The cooling air flowing through the test specimen 14 then flows through the ports in the plunger rod 52 as seen by the arrows in FIG. 3 and then between the space formed between the plunger rod 52 and the specimen holder 51. The cooling air flowing through the hollow test specimen 14 provides for cooling of the inner wall of the test specimen and duplicates the effect of the cooling air on the inner wall of the turbine airfoil. The cooling air then flows out through the port or ports 46 in the specimen holder 51 and into the space formed between the upper combustor liner 42 and the upper combustor wall, and then into the upper plenum chamber 47 that surrounds the combustor 12.

The cooling air from the upper combustor liner 42 accumulates in the upper plenum chamber 47 that surrounds the combustor 12 to provide cooling for the combustor liner and to preheat the air that will then be discharged into the combustor for burning with a fuel. The air collected in the upper plenum chamber 47 will then flow down and over the bottom end of the combustor liner 41 and into the space formed between the combustor wall and the combustor liner 41 in a direction toward the top end of the combustor 12. The cooling air that flows between the spaces formed over the combustor wall will flow through film cooling holes formed within the combustor wall to provide a layer of film cooling air within the combustor 12. some of the cooling air will also flow through a number of air injection ports 66 spaced around the combustor wall that discharge the air to produce a swirl motion within the combustor 12. The arrows in FIG. 3 represent the cooling air flow from the plenum chamber 47 and into the combustor 12.

Fuel in injected into the combustor 12 through a number of fuel injectors 36 located around the side walls of the combustor 12. The swirling hot gas flow produced by the combustion is then directed out through an opening on the bottom of the combustor 12 and through the sapphire vessel 53 and over the outer surface of the test specimen on which the coating is located. The swirling motion formed within the combustor 12 produces a more even temperature within the hot gas flow that is then passed over the test specimen. An even temperature is required for testing of a coating on the test specimen.

The hot gas stream then flows out from the sapphire vessel 53 and into the exhaust plenum 11 where the hot gas stream is diluted with cooling air that is used to cool the walls that form the exhaust plenum 11 and lower the temperature of the hot gas stream prior to flowing out through the exhaust port 15. The cooling air injected through the ports 37-40 provide cooling for the exhaust plenum walls before being discharged through the film cooling holes and into the exhaust plenum as dilution air for the hot gas stream. Water can also be injected into the hot exhaust flowing through the exhaust port 15 to further cool the hot gas flow prior to being discharged from the exhaust port 15.

During testing of a coating on the test specimen, the pneumatic cylinder 21 can apply a tensile load to the test specimen 14 through the load cell 17 and the adapter 18 by pulling on the test specimen 14. Compressed air for the pneumatic cylinder 21 if from the same source as the cooling air and combustion air used in the combustor 12, and therefore only one compressed air source is required for the test rig 10. Also, since air is used for the actuator, no combustible fluid such as oil is used that could spill or leak onto the hot section of the test rig 10 that would create a fire hazard. Also, since the pneumatic cylinder and the connecting parts to the test specimen 14 are all located below the hot section of the test rig 10, less chance of a fire hazard on the test rig 10 is also produced. The vertical orientation of the test rig 10 also provides for minimal space required for the test rig 10 on a shop floor.

We claim the following:

1. A test rig for testing a material under a high pressure and high temperature conditions, the test rig comprising:
   a combustor to produce a hot gas stream;
   an exhaust plenum to receive the hot gas stream from the combustor;
   a test specimen extending from the combustor and passing through the exhaust plenum, the test specimen having an outer surface for placing a material to be tested and an enclosed inner surface that forms a cooling fluid passage;
   a hot gas stream channeling vessel that extends into the exhaust plenum and ends within the exhaust plenum; and,
   the test specimen extending through the hot gas stream channeling vessel to form a flow passage over the test specimen for the hot gas stream from the combustor.

2. The test rig of claim 1, and further comprising:
   the hot gas stream channeling vessel has an inlet end that has a decreasing diameter in a direction of the hot gas stream flow and an outlet end that has a constant diameter.

3. The test rig of claim 1, and further comprising:
   the hot gas stream channeling vessel is made of a transparent material.

4. The test rig of claim 3, and further comprising:
   a viewing portal in the exhaust plenum area positioned such that a section of the test specimen within the transparent channeling vessel can be viewed through the viewing portal.

5. The test rig of claim 3, and further comprising:
   the hot gas stream channeling vessel is a sapphire vessel.

6. The test rig of claim 1, and further comprising:
   an upper plenum chamber formed around the combustor; and,
   a combustor liner formed around the combustor with a space between the combustor wall and the combustor liner for cooling air to flow.

7. The test rig of claim 1, and further comprising:
   the test rig is oriented in a vertical direction;
   a pneumatic cylinder located below the combustor and the exhaust plenum; and,
   the pneumatic cylinder includes an actuator connected to the test specimen such that a tensile load can be applied to the test specimen during testing.

8. The test rig of claim 6, and further comprising:
   means to channel cooling air from the test specimen into the upper plenum chamber;
   means to channel cooling air from the upper plenum chamber through the cooling passage between the combustor wall and the combustor liner; and,
   means to channel cooling air from the cooling passage between the combustor wall and the combustor liner and into the combustor.

9. The test rig of claim 1, and further comprising:
   the exhaust plenum includes an exhaust plenum liner that forms a cooling air passage around the exhaust plenum; and,
   film cooling air holes positioned around the exhaust plenum to discharge film cooling air from the cooling air passage and into the exhaust plenum.

10. The test rig of claim 1, and further comprising:
    an exhaust port opening into the exhaust plenum to discharge the hot gas stream from the exhaust plenum.

11. A process for testing a material under high pressure and high temperature conditions similar to a turbine in a gas turbine engine, the process comprising the steps of:
    passing cooling air through a test specimen with a material to be tested secured onto an outer surface of the test specimen;
    passing the cooling air from the test specimen into an upper plenum chamber formed around a combustor;
    passing the cooling air from the upper plenum chamber around the combustor to provide cooling for the combustor walls;
    passing the cooling air that provided cooling to the combustor walls into the combustor to produce a hot gas stream with a fuel;
    channeling the hot gas stream from the combustor over the test specimen on which the material to be tested is located;
    discharging the hot gas stream into an exhaust plenum after passing the hot gas stream over the material to be tested;
    diluting the hot gas stream within the exhaust plenum with cooling air to lower the temperature of the hot gas stream; and,
    discharging the hot gas stream from the exhaust plenum.

12. The process for testing a material of claim 11, and further comprising the step of:
    channeling the hot gas stream from the combustor into the exhaust plenum through a transparent vessel; and,
    observing the material to be tested through the transparent vessel as the hot gas stream passes over the material to be tested.

13. The process for testing a material of claim 12, and further comprising the step of:
    the step of observing the material includes locating a viewing port in the exhaust plenum with the transparent vessel in sight.

14. The process for testing a material of claim 11, and further comprising the step of:
    the step of diluting the hot gas stream within the exhaust plenum with cooling air includes passing the cooling air over the exhaust plenum to cool the exhaust plenum prior to passing the cooling air into the exhaust plenum.

15. The process for testing a material of claim 11, and further comprising the step of:
    injecting water into the exhaust port to further cool the hot gas stream.

16. The process for testing a material of claim 11, and further comprising the step of:
    forming a tensile load on the test specimen during the testing of the material.

17. The process for testing a material of claim 11, and further comprising the step of:
    injecting cooling air into the combustor in a swirling direction to produce a swirl motion within the combustor such that a more even hot gas stream temperature is produced.

18. The process for testing a material of claim 11, and further comprising the steps of:
    removing a lower test specimen securing piece from the lower end of the test specimen;
    removing a cap from an upper end of the test specimen; and,
    removing the test specimen from the combustor and exhaust plenum.

* * * * *